United States Patent Office 3,574,622
Patented Apr. 13, 1971

3,574,622
PHOTOPOLYMERIZATION USING N-ALKOXY
HETEROCYCLIC INITIATORS
Philip W. Jenkins, Donald W. Heseltine, and John D. Mee, Rochester, N.Y., assignors to Eastman Kodak Company, Rochester, N.Y.
No Drawing. Filed Oct. 9, 1968, Ser. No. 766,304
Int. Cl. G03c *1/70;* C09b *23/10, 23/06*
U.S. Cl. 96—67
42 Claims

ABSTRACT OF THE DISCLOSURE

Energy-sensitive compounds containing a heterocyclic nitrogen atom substituted with an —OR group where R is an alkyl, aryl, or acyl radical, are photochemical initiators for the polymerization of vinyl monomers.

---

This invention relates to photopolymerization and to a novel class of photochemical initiators.

The polymerization process takes place in one of two ways; namely, by condensation or by addition. Condensation polymerization involves the chemical reaction of two monomers to produce one larger molecule with the elimination of a molecule such as water. The larger molecule then reacts with other monomers in the same fashion until the supply of monomers is exhausted. Addition polymerization involves the opening of a double bond by an initiator and the subsequent addition to the double bond by a second molecule of monomer. The initiator is generally a different molecule than the monomer to be polymerized and is characterized by the fact that it generates cations, anions or free radicals easily upon the absorption of energy. In the case of free radicals an unpaired electron of the free radical pairs with an electron of the double bond generating a new free radical which undergoes further addition of other monomer molecules. When two growing chains react, each containing a free radical end, the resultant chain becomes inert. Free radical, cationic and anionic polymerization mechanisms are more fully described in Billmeyer, "Textbook of Polymer Science," Chapters 9 and 10, Interscience 1962.

Initiators can be activated in a number of ways, e.g. thermally, by electron transfer, etc. Photochemical initiators such as organic peroxides, azonitriles, diketones, etc., dissociate upon the absorption of electromagnetic radiation. However, the wavelength of the radiation must be sufficiently short (usually in the ultraviolet range) so as to impart enough energy to the initiator to cause it to form free radicals. In order to use visible light as an activator, it is usually necessary to employ a sensitizer or a reducing agent in association with the initiator.

It is an object of this invention to provide a novel class of photochemical initiators.

It is also an object of this invention to provide polymerizable composition containing these novel photochemical initiators.

It is another object of this invention to provide photographic elements containing novel photochemical initiators.

A further object of this invention is to provide a process for polymerizing various vinyl monomers using novel photochemical initiators.

Another object of this invention is to provide a novel process for forming an image using photographic elements containing novel photochemical initiators.

These and other objects are accomplished with photopolymerizable compositions comprising a vinyl monomer and photochemical initiating dyes that have one of the following structures:

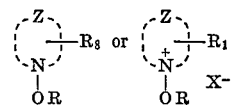

wherein:

R₁ can be any of the following
- (a) a methine linkage terminated by a heterocyclic nucleus of the type contained in cyanine dyes, e.g., those set forth in Mees and James, "The Theory of the Photographic Process," MacMillan 3rd ed., pp. 198–232; the methine linkage can be substituted or unsubstituted, e.g., —CH=, —C(CH₃)=, —C(C₆H₅)=, —CH=CH—CH=, etc.;
- (b) an alkyl radical preferably containing 1 to 8 carbon atoms including a substituted alkyl radical;
- (c) an aryl radical including a substituted aryl radical such as a phenyl radical, a naphthyl radical, a tolyl radical, etc.;
- (d) a hydrogen atom;
- (e) an acyl radical having the formula

wherein R is hydrogen or an alkyl group preferably having 1 to 8 carbon atoms;
- (f) an anilinovinyl radical having the formula:

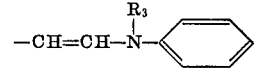

wherein R₃ is hydrogen, acyl or alkyl; or
- (g) a styryl radical including substituted styryl radcals, e.g.,

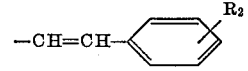

wherein R₂ is hydrogen, alkyl, aryl, amino including dialkylamino such as dimethylamino;

R₈ can be either of the following:
- (a) a methine linkage terminated by a heterocyclic nucleus of the type contained in merocyanine dyes, e.g., those set forth in Mees and James (cited above); the methine linkage can be substituted or unsubstituted; or
- (b) an allylidene radical including a substituted allylidene radical such as a cyanoallylidene radical, an alkylcarboxyallylidene radical or an alkylsulfonylallylidene radical;

R can be either
- (a) an alkyl radical preferably having 1 to 8 carbon atoms such as methyl, butyl, etc., including a substituted alkyl radical such as sulfoalkyl, e.g., —CH₂SO₃⁻, and aralkyl, e.g., benzyl or pyridinato-oxyalkyl salt, e.g., —(CH₂)₃—O—Y where Y is a substituted or unsubstituted pyridinium salt;
- (b) an acyl radical, e.g.,

wherein R₆ is an alkyl radical preferably having 1 to 8 carbon atoms or aryl radical, e.g., methyl, ethyl, propyl, butyl, phenyl, naphthyl, etc.;
- (c) an aryl radical including a substituted aryl radical, e.g., phenyl, naphthyl, tolyl, etc.;

Z represents the atoms necessary to complete a 5 to 6 membered heterocyclic nucleus including a substituted heterocyclic nucleus which can contain at least one additional hetero atom such as oxygen, sulfur, selenium or nitrogen, e.g., a pyridine nucleus, an indole nucleus, a quinoline nucleus, etc.; and X represents an acid anion e.g., perchlorate, chloride, bromide, sulfamate, thiocyanate, p-toluenesulfonate, methyl sulfate, tetrafluoroborate, etc.

When these dyes are exposed to electromagnetic radiation, they are decomposed by a heterolytic cleavage of the nitrogen-oxygen (N—O) bond to produce a $RO^+$ ion, a dye base and an acid anion. The $RO^+$ ion can be decomposed even further. According to this invention the fragments produced by this technique are used to initiate the polymerization of various vinyl monomers either by free radical or by cationic techniques. The particular route of the fragmentation reaction is somewhat dependent upon the structure of the original compound. However, based upon certain observations, it is believed that the route followed by most of the compounds of this invention (such as the one given below) when exposed to electromagnetic radiation (such as light) is the following:

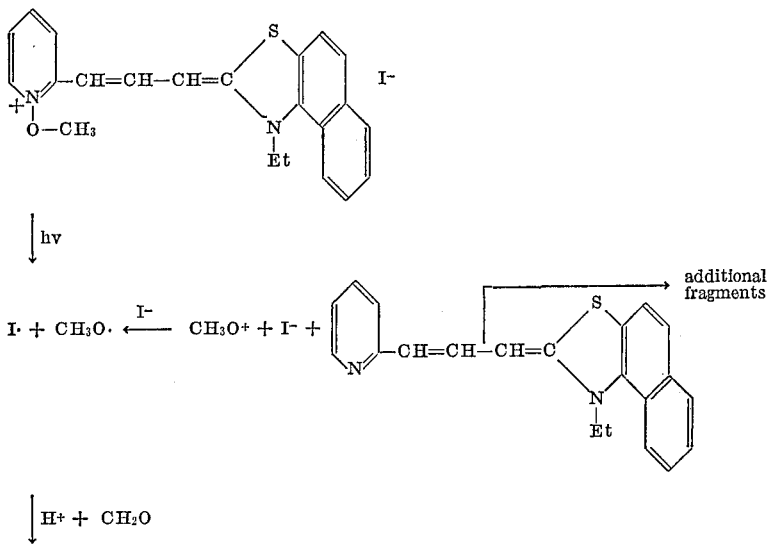

It is clear from the decomposition reaction that both cations and free radicals are available for either a cationic polymerization or a free radical polymerization. The mechanisms of these polymerizations are more fully described in Billmeyer "Textbook of Polymer Science," Interscience, 1962, pp. 262–309. The precise mechanism of the polymerizations described herein is unknown but is believed to be either cationic, free radical or a combination of both.

The preferred photochemical initiating dyes of this invention have one of the following structures:

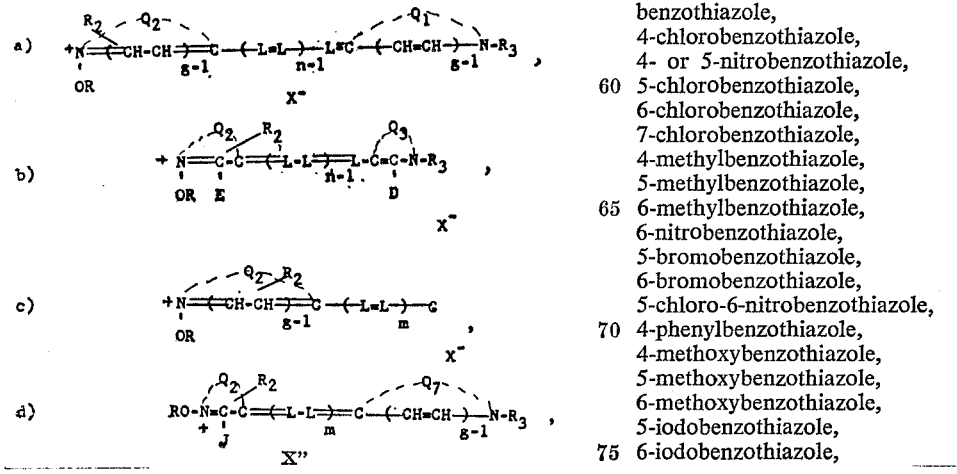

wherein $Q_1$, $Q_2$, $Q_3$, $Q_7$ and $Q_9$ each represent the nonmetallic atoms necessary to complete a sensitizing or desensitizing nucleus containing from 5 to 6 atoms in the heterocyclic ring, which nucleus may contain a second hetero atom such as oxygen, sulfur, selenium or nitrogen, i.e., a nucleus of the type used in the production of cyanine dyes, such as the following representative nuclei: a thiazole nucleus, e.g., thiazole,
4-methylthiazole,
3-ethylthiazole,
4-phenylthiazole,
5-methylthiazole,
5-phenylthiazole,
4,5-dimethylthiazole,
4,5-diphenylthiazole,
4-(2-thienyl)thiazole,
benzothiazole,
4-chlorobenzothiazole,
4- or 5-nitrobenzothiazole,
5-chlorobenzothiazole,
6-chlorobenzothiazole,
7-chlorobenzothiazole,
4-methylbenzothiazole,
5-methylbenzothiazole,
6-methylbenzothiazole,
6-nitrobenzothiazole,
5-bromobenzothiazole,
6-bromobenzothiazole,
5-chloro-6-nitrobenzothiazole,
4-phenylbenzothiazole,
4-methoxybenzothiazole,
5-methoxybenzothiazole,
6-methoxybenzothiazole,
5-iodobenzothiazole,
6-iodobenzothiazole, 4-ethoxybenzothiazole,
5-ethoxybenzothiazole,
tetrahydrobenzothiazole,
5,6-dimethoxybenzothiazole,
5,6-dioxymethylenebenzothiazole,
5-hydroxybenzothiazole,
6-hydroxybenzothiazole,
α-naphthothiazole,
β-naphthothiazole,
β,β-naphthothiazole,
5-methoxy-β,β-naphthothiazole,
5-ethoxy-β-naphthothiazole,
8-methoxy-α-naphthothiazole,
7-methoxy-α-napthothiazole,
4'-methoxythianaphtheno-7',6',4,5-thiazole,
nitro group substituted naphthothiazoles, etc.;

an oxazole nucleus, e.g., 4-methyloxazole,
4-nitro-oxazole,
5-methyloxazole,
4-phenyloxazole,
4,5-diphenyloxazole,
4-ethyloxazole,
4,5-dimethyloxazole,
5-phenyloxazole,
benzoxazole,
5-chlorobenzoxazole,
5-methylbenzoxazole,
5-phenylbenzoxazole,
5- or 6-nitrobenzoxazole,
5-chloro-6-nitrobenzoxazole,
6-methylbenzoxazole,
5,6-dimethylbenzoxazole,
4,6-dimethylbenzoxazole,
5-methoxybenzoxazole,
5-ethoxybenzoxazole,
5-chlorobenzoxazole,
6-methoxybenzoxazole,
5-hydroxybenzoxazole,
6-hydroxybenzoxazole,
α-naphthoxazole,
β-naphthoxazole,
nitro group substituted naphthoxazoles, etc.;

a selenazole nucleus, e.g., 4-methylselenazole,
4-nitroselenazole,
4-phenylselenazole,
benzoselenazole,
5-chlorobenzoselenazole,
5-methoxybenzoselenazole,
5-hydroxybenzoselenazole,
5- or 6-nitrobenzoselenazole,
5-chloro-6-nitrobenzoselenazole,
tetrahydrobenzoselenazole,
α-naphthoselenazole,
β-naphthoselenazole,
nitro group substituted naphthoselenazoles, etc.;

a thiazoline nucleus, e.g., thiazoline,
4-methylthiazoline,
4-nitrothiazoline, etc.;

a pyridine nucleus, e.g., 2-pyridine,
5-methyl-2-pyridine,
4-pyridine,
3-methyl-4-pyridine,
nitro group substituted pyridines, etc.;

a quinoline nucleus, e.g., 2-quinoline,
3-methyl-2-quinoline,
5-ethyl-2-quinoline,
6-chloro-2-quinoline,
6-nitro-2-quinoline,
8-chloro-2-quinoline,
6-methoxy-2-quinoline,
8-ethoxy-2-quinoline,
8-hydroxy-2-quinoline,
4-quinoline,
6-methoxy-4-quinoline,
6-nitro-4-quinoline,
7-methyl-4-quinoline,
8-chloro-4-quinoline,
1-isoquinoline,
6-nitro-1-isoquinoline,
3,4-dihydro-1-isoquinoline,
3-isoquinoline, etc.;

a 3,3-dialkylindolenine nucleus, preferably having a nitro cyano substituent, e.g., 3,3-dimethyl-5 or 6-nitroindolenine,
3,3-dimethyl-5- or 6-cyanoindolenine, etc.; and, an imidazole nucleus e.g., imidazole,
1-alkylimidazole,
1-alkyl-4-phenylimidazole,
1-alkyl-4,5-dimethylimidazole,
benzimidazole,
1-alkylbenzimidazole,
1-alkyl-5-nitrobenzimidazole,
1-aryl-5,6-dichlorobenzimidazole,
1-alkyl-α-naphthimidazole,
1-aryl-β-naphthimidazole,
1-alkyl-5-methoxy-α-naphthimidazole, or, an imidazo [4,5-b]quinoxaline nucleus, e.g., 1-alkylimidazo[4,5-b]quinoxaline such as 1-ethylimidazo[4,5-b]quinoxaline,
6-chloro-1-ethylimidazo[4,5-b]quinoxaline, etc.,
1-alkenylimidazo[4,5-b]quinoxaline such as 1-allylimidazo[4,5-b]quinoxaline,
6-chloro-1-allylimidazo[4,5-b]quinoxaline, etc.,
1-arylimidazo[4,5-b]quinoxaline such as 1-phenylimidazo[4,5-b]quinoxaline,
6-chloro-1-phenylimidazo[4,5-b]quinoxaline, etc.;

a 3,3-dialkyl-3H-pyrrolo[2,3-b]pyridine nucleus e.g., 3,3-dimethyl-3H-pyrrolo[2,3-b]pyridine,
3,3-diethyl-3H-pyrrolo[2,3-b]pyridine, etc.;

a thiazolo[4,5-b]quinoline nucleus; an indolyl nucleus including substituted indolyl nuclei such as a 2-phenyl-3-indole, 1-methyl-2-phenyl-3-indole; and the like; $R_3$ represents an alkyl group, including substituted alkyl (preferably a lower alkyl containing from 1 to 4 carbon atoms), e.g., methyl, ethyl, propyl, isopropyl, butyl, hexyl, cyclohexyl, decyl, dodecyl, etc., and substituted alkyl groups, (preferably a substituted lower alkyl containing from 1 to 4 carbon atoms), such as a hydroxyalkyl group, e.g., β-hydroxyethyl, ω-hydroxybutyl, etc., an alkoxyalkyl group, e.g., β-methoxyethyl, ω-butoxybutyl, etc., a carboxyalkyl group, e.g., β-carboxyethyl, ω-carboxybutyl, etc., an alkoxy group, e.g., methoxy, ethoxy, etc., a sulfoalkyl group, e.g., β-sulfoethyl, ω-sulfobutyl, etc., a sulfatoalkyl group, e.g., β-sulfatoethyl, ω-sulfatobutyl, etc., an acyloxyalkyl group, e.g., β-acetoxyethyl, γ-acetoxypropyl, ω-butyryloxybutyl, etc., an alkoxycarbonylalkyl group, e.g., β-methoxycarbonylethyl, ω-ethoxycarbonylbutyl, etc. or an aralkyl group, e.g., benzyl, phenethyl, etc.; an alkenyl group, e.g., allyl, 1-propenyl, 2-butenyl, etc., or an aryl group, e.g., phenyl, tolyl, napthyl, methoxyphenyl, chlorophenyl, etc.; $n$ is a positive integer from 1 to 4; $m$ is a positive integer from 1 to 3; $g$ is positive integer from 1 to 2; L represents a methine linkage, e.g., —CH=; —C(CH$_3$)=, —C(C$_6$H$_5$)=, etc.; D, E, J, $R_2$ and $R_4$ each represent a hydrogen atom, an alkyl group (preferably a lower alkyl containing from a 1 to 4 carbon atoms), e.g., methyl, ethyl, propyl, isopropyl, butyl, decyl, dodecyl, etc., or an aryl group, e.g., phenyl, tolyl, naphthyl, methoxyphenyl, chlorophenyl, nitrophenyl, etc.; X represents an acid anion, e.g., chloride, bromide, sulfamate, thiocyanate, p-toluenesulfonate, methylsulfate, perchlorate, tetrafluoroborate, etc.; G represents an anilino radical or an aryl radical, e.g., phenyl, napthyl, dialkylaminophenyl, tolyl, chlorophenyl, nitrophenyl, etc.; $R_5$ is an alkyleneoxy radical having 1 to 8 carbon atoms in the alkylene chain including an alkylenedioxy radical and an arylenebisalkoxy radical e.g., ethyleneoxy, trimethyleneoxy, tetramethyleneoxy, pyropylideneoxy, ethylenedioxy, phenylenebisethoxy, etc.; R represents either (1) an alkyl radical including substituted alkyl (preferably a lower alkyl having 1 to 4 carbon atoms) e.g., methyl, ethyl, propyl, isopropyl, butyl, hexyl, cyclohexyl, decyl, dodecyl, alkaryl such as benzyl, sulfoalkyl such as β-sulfoethyl, ω-sulfobutyl, ω-sulfopropyl, or (2) an acyl radical, e.g.,

wherein R is an alkyl including a substituted alkyl or an aryl such as methyl, phenyl, naphthyl, propyl, benzyl, etc.

In the above formula $Q_2$ is preferably a pyridine, an indole or a quinoline nucleus. Also, D, E and J are preferably aryl radicals. Nuclei wherein $Q_1$, $Q_2$, $Q_3$, $Q_7$ and $Q_9$ complete an imidazo[4,5-b]quinoxaline nucleus, or a nitro group substituted thiazole, oxazole, selenazole, thiazoline, pyridine, quinoline, indole, or imidazole nucleus are desensitizing nuclei.

Typical photochemical initiating compounds useful in the invention including the following:

TABLE I (1) 3-ethyl-1'-methoxyoxa-2'-pyridocarbocyanine perchlorate
(2) 1'-ethoxy-3-ethoxy-2'-pyridocarbocyanine tetrafluoroborate
(3) 3'-ethyl-1-methoxy-2-pyridothiacyanine iodide
(4) 1-ethoxy-3'-ethyl-2-pyridothiacyanine tetrafluoroborate
(5) 1-benzyloxy-3'-ethyl-2-pyridothiacyanine iodide
(6) 3'-ethyl-1-methoxy-2-pyridothiacarbocyanine iodide
(7) 1-ethoxy-3'-ethyl-2-pyridothiacarbocyanine tetrafluoroborate
(8) anhydro-3'-ethyl-1-(3-sulfopropoxy)-2-pyridothiacarbocyanine hydroxide
(9) 1-benzyloxy-3'-ethyl-2-pyridothiacarbocyanine perchlorate
(10) 3'-ethyl-1-methoxy-2-pyridothiadicarbocyanine perchlorate
(11) 1'-methoxy-1,3,3-trimethylindo-2'-pyridocarbocyanine picrate
(12) 3'-ethyl-1-methoxy-4',5'-benzo-2-pyridothiacarbocyanine perchlorate
(13) 1-ethoxy-3'-ethyl-4',5-benzo-2-pyridothiacarbocyanine tetrafluoroborate
(14) 1'-ethoxy-3-ethyloxa-2'-carbocyanine tetrafluoroborate
(15) 1'-ethoxy-3-ethylthia-2'-cyanine tetrafluoroborate
(16) 1'-ethoxy-3-ethylthia-2'-carbocyanine tetrafluoroborate
(17) 1'-ethoxy-3-ethylthia-2'-dicarbocyanine tetrafluoroborate
(18) 1-methoxy-3'-methyl-2'-pyridothiazolinocarbocyanine perchlorate
(19) 3'-ethyl-1-methoxy-4-pyridothiacyanine perchlorate
(20) 3'-ethyl-1-methoxy-4-pyridothiacarbocyanine perchlorate
(21) 1,1'-dimethoxy-2,2'-diphenyl-3,3'-indolocarbocyanine perchlorate
(22) 1-methoxy-1'-methyl-2,2',10-triphenyl-3,3'-indolocarbocyanine perchlorate
(23) 1,1'-diethoxy-2,2'-diphenyl-3,3'-indolocarbocyanine perchlorate
(24) 1-ethoxy-1'-methyl-2,2',10-triphenyl-3,3'-indolocarbocyanine perchlorate
(25) 1'-ethoxy-3-ethyl-4,5-benzothia-2'-carbocyanine tetrafluoroborate
(26) 2-β-anilinovinyl-1-methoxypyridinium p-toluenesulfonate
(27) 1-ethyl-1'-methoxy-4,5-benzothia-4'-carbocyanine perchlorate
(28) 3'-ethyl-1-methoxy-6'-nitro-2-phenyl-3-indolothiacarbocyanine p-toluenesulfonate
(29) 1-ethoxy-3'-ethyl-6'-nitro-2-phenyl-3-indolothiacarbocyanine p-toluenesulfonate
(30) 1,3-diallyl-1'-methoxy-2'-phenylimidazo[4,5-b]quinoxalino-3'-indolocarbocyanine perchlorate
(31) 1,3-diallyl-1'-ethoxy-2'-phenylimidazo[4,5-b]quinoxalino-3'-indolocarbocyanine perchlorate
(32) 1-methoxy-2-methylpyridinium p-toluenesulfonate
(33) 1-methoxy-4-methylpyridinium p-toluenesulfonate
(34) anhydro-2-methyl-1-(3-sulfopropoxy)pyridinium hydroxide
(35) 1-ethoxy-2-methylpyridinium tetrafluoroborate
(36) 1-benzyloxy-2-methylpyridinium bromide
(37) 1-ethoxy-2-methylquinolinium tetrafluoroborate
(38) 1-methoxy-2-phenylindole
(39) 1-ethoxy-2-phenylindole
(40) 1'-methoxy-1,3,3-trimethyl-5-nitro-2'-phenylindo-3'-indolocarbocyanine perchlorate
(41) 1-methoxy-1',3',3-trimethyl-2-phenyl-3-indolo-2'-pyrrolo[2,3-b]pyridocarbocyanine perchlorate
(42) 1'-ethoxy-1,3,3-trimethyl-5-nitro-2'-phenylindo-3'-indolocarbocyanine p-toluenesulfonate
(43) 1-ethoxy-1',3',3'-trimethyl-2-phenyl-3-indolo pyrrolo[2,3-b]pyridocarbocyanine perchlorate
(44) 1,1'-ethylenedioxybispyridinium dibromide
(45) 1,1'-trimethylenedioxybispyridinium dibromide
(46) 1,1'-tetramethylenedioxybis(2-methylpyridinium) dibromide
(47) 1,1'-tetramethylenedioxybis(4-methylpyridinium) dibromide
(48) 1,1'-tetramethylenedioxybispyridinium dibromide
(49) 1,1'-pentamethylenedioxybispyridinium dibromide
(50) 1-methoxy-2-phenylindole-3-carboxaldehyde
(51) 1-ethoxy-2-phenylindole-3-carboxaldehyde
(52) 1-acetoxy-2-(4-dimethylaminostyryl)pyridinium perchlorate
(53) 1-benzoyloxy-2-(4-dimethylaminostyryl)pyridinium perchlorate
(54) 1,3-diethyl-5-[(1-methoxy-2(1H)-pyridylidene)ethylidene]-2-thiobarbituric acid
(55) 3-ethyl-5-[(1-methoxy-2(1H)-pyridylidene)ethylidene]rhodanine
(56) 1,3-diethyl-5-[(1-methoxy-2(1H)-pyridylidene)ethylidene]barbituric acid
(57) 2-(3,3-dicyanoallylidene)-1-methoxy-1,2-dihydropyridine
(58) 2-[(1-methoxy-2(1H)-pyridylidene)ethylidene]benzo[b]thiophen-3(2H)-one-1,1-dioxide
(59) 3-cyano-5-[(1-methoxy-2(1H)-pyridylidene)ethylidene]-4-phenyl-p(5H)-furanone.

The novel initiators of this invention can be prepared by the method described by Jenkins, Heseltine and Mee in an application filed concurrently herewith titled "Energy-Sensitive Systems."

The photochemical polymerization initiating dyes of this invention are capable of initiating the polymerization of any polymerizable vinyl monomer including mixtures thereof to form copolymers, terpolymers, etc. The preferred vinyl monomers according to this invention have the following structure:

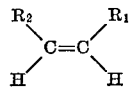

wherein $R_1$ and $R_2$ each can be
(a) a heterocyclic nucleus containing 5 to 7 atoms including at least one nitrogen, sulfur, selenium or oxygen atom in the heterocyclic nucleus and also including substituted heterocyclic nuclei;
(b) a nitrile group;
(c) hydrogen;
(d) an acyl group e.g.,

wherein $R_3$ completes a carboxylic acid radical, a carboxylic acid ester radical, an acyl halide radical or an amide radical;
(e) an amino group including substituted amino groups e.g.,

wherein $R_4$ and $R_5$ are either hydrogen, alkyl or aryl groups;
(f) an alkoxy group including substituted alkoxy groups e.g., methoxy, butoxy, pentoxy, etc.;
(g) an aryloxy group including substituted aryloxy groups e.g., phenoxy, naphthoxy, etc.;
(h) a hydroxyl group;
(i) a halogen atom;
(j) an alkyl group including substituted alkyl groups preferably having 1 to 8 carbon atoms, e.g., methyl, propyl, isobutyl, benzyl, etc.;
(k) an aromatic radical including substituted aromatic radicals, e.g., phenyl, naphthyl, tolyl, mesityl, halophenyl, xylyl, etc.;
(l) a vinylene radical e.g., $-CH=CH-R_6$ wherein $R_6$ is hydrogen, alkyl or aryl; or
(m) an ethynylene radical e.g., $-C\equiv C-R_7$ wherein $R_7$ is hydrogen, alkyl or aryl.

Typical of the vinyl monomers useful as starting materials in this invention are acrylic monomers such as acrylonitrile, methacrylonitrile, methacrylic acid, acrylic acid, acrylamide, methacrylamide, methyl methacrylate, methyl acrylate, etc.; styrene monomers; vinylcarbazole monomers; vinyl acetate such as alkyl vinyl esters; acenaphthalenes; 1 and 2 vinyl naphthalenes; vinyl mesitylenes; etc.

The reaction diluent can be any organic or inorganic solvent in which both the monomer and initiator are soluble to a substantial extent. In the case where it is desired to recover the polymer in particulate form, the diluent should be one such that the polymer formed is insoluble therein. If a solution of polymer in solvent is desired, then, of course, the solvent should be one in which the monomer and polymer are soluble. The amount of solvent used is not critical and the minimum amount necessary is that which ensures that all of the starting materials (and optionally polymer) are in solution. Up to 90% by weight of solvent can be used in the polymerization mixture. No solvent is required in certain instances where the monomer is in liquid form, i.e., the reaction is a mass polymerization. The amount of initiator used can vary widely, the minimum being that required to initiate and sustain the desired polymerization rate, at least about 0.001% being typical with 0.001% to 10% by weight of the polymerization mixture being generally used.

In order to effect the polymerization, the system is irradiated with electromagnetic radiation including ultraviolet, infrared, X-rays and visible light. The preferred form of electromagnetic radiation is visible light. It is only necessary to irradiate with the wavelength for which the dye being used has its maximum absorption. No reducing agent or sensitizer is necessary to make the initiators of this invention responsive to wavelengths in the visible portions of the spectrum. Accordingly, this presents a distinct advantage over prior art photochemical initiators which generally are responsive only in the ultraviolet regions in the absence of a reducing agent or sensitizing compound.

Depending on the nature of the polymer desired, additional conventional materials can be present in the reaction mixture such as modifiers, antistatic agents, polymerization accelerators, chain transfer agents, inhibitors, retarders, etc. The polymerization reaction temperature can be widely varied and typically ranges from $-100°$ C. to $150°$ C. and preferably from $-50°$ C. to $50°$ C. The reaction pressure can also be widely varied and typically ranges from 0.01 atm. to 100 atm. and preferably from 1 atm. to 25 atm. The polymerization can proceed for any suitable period so as to ensure substantially complete polymerization of the monomer in solution.

When a non-solvent for the polymer is used as the reaction diluent, the polymer which precipitates out of solution can be recovered by conventional techniques such as filtration, washing and drying. Such a polymerization can be carried out on a continuous basis merely by continuously adding fresh monomer, initiator and diluent if necessary, continuously irradiating the reaction mixture with a light source having a wavelength corresponding to the maximum absorption of the initiating dye and continuously removing particular polymer.

There are many practical applications which use the polymerizable compositions of this invention, particularly those wherein the polymer is soluble in the diluent. Typical applications include photosensitive emulsions, printing plates such as lithographic plates and other photocopying applications. A printing plate can be made by coating a solution of monomer which on polymerization forms a hydrophobic polymer, solvent and initiator on a support such as paper, glass, plastic, metal, etc. The coating can then be exposed in an imagewise manner to a pattern of actinic radiation. Polymerization takes place only in the exposed areas. If the combination of initiator and monomer are very active such that polymerization continues into the unexposed areas, then it may be desirable to add a polymerization retarder so as to confine the polymerization to the light struck areas. After exposure the element can be washed with a solvent for the monomer so that the unexposed areas are washed off and only polymerized areas remain. The final image is suitable for direct printing by inking the image and contacting it with a suitable surface such as paper, either directly or through an offset roller. The affinity for the ink is also related to the degree of polymerization and thus an extremely true and accurate reproduction can be made. The photo image generally has a higher affinity for most inks than the backing. The method is suitable for line copying and also for half-tone and for continuous-tone prints.

In color photography a three plate system can be used. Each of the plates is coated with a polymerizable solution containing a different dye initiator which absorbs a different primary color. After exposure of the three elements to a colored subject, each plate is washed to remove the unpolymerized areas and dried. One plate is inked with red, a second with blue and a third with green and, in register, each of the images is transferred to a single sheet of paper to produce a color reproduction of the original.

The unpolymerized solutions can also be used for bonding purposes. After the solution is coated to the materials to be bonded together, polymerization is effected merely by subjecting the materials to a light source. If the materials are opaque, then polymerization can be carried out by using an initiator which is responsive to penetrating radiation such as X-rays. After polymerization is completed, the adhesion of the materials is excellent.

Other uses for these polymer compositions include coating or impregnating materials such as paper, fibers, fabrics, etc.

The following examples are included for a further understanding of the invention.

EXAMPLE 1

A solution of 0.5 g. of N-vinylcarbazole in 2 ml. of dichloromethane (dried over Linde Type 3A molecular sieves) is prepared. Nitrogen gas is bubbled through the solution until the volume is reduced to that of a solution made up to 0.5 g. of N-vinylcarbazole in 1.5 ml. dichloromethane. The solution is transferred to a test tube containing a magnetic stirring bar and 2.5 mg. of the compound to be tested. Nitrogen is bubbled for 1 min. through the solution and the test tube is stoppered. The test tube is partially immersed in an acetone bath contained in a petri dish. Dry Ice is used as the coolant and the temperature is monitored by means of a blank solution placed alongside the test solution which contains a thermocouple. After chilling and while stirring, the test solution is irradiated with the light from a 150 watt xenon arc lamp (filtered with Corning CS 3–73 and CS 3–74 filters if the test compound absorbs at wavelengths>400 nm.; unfiltered if the test compound absorbs in the ultraviolet.) A visual comparison of the charge in viscosity relative to the viscosity of a blank solution is summarized for a number of the initiators of this invention in Table II.

TABLE II

| Initiator compound [1] | Anion | Temperature °C. | Time of irradiation, min. | Final viscosity |
|---|---|---|---|---|
| Blank | | 20° to (−27°) | 90 | Free flowing.[2] |
| 1 | ClO$_4^-$ | 20° to 30° | 30 | Viscous. |
| 12 | ClO$_4^-$ | 20° to 27° | 30 | Do. |
| 35 | BF$_4^-$ | (−15°) to (−20°) | 5½ | Solid. |
| 4 | BF$_4^-$ | do | 30 | Viscous. |
| 13 | BF$_4^-$ | do | ½ | Do. |
| 7 | BF$_4^-$ | do | 30 | Do. |
| 2 | BF$_4^-$ | do | 10 | Do. |
| 11 | Picrate | 20° to 27° | 30 | Slightly viscous.[2] |
| 12 | p-ts | do | 30 | Do. |
| 3 | I$^-$ | 20° to (−27°) | 30 | Do. |

[1] See Table I.
[2] After chilling.

EXAMPLE 2

An aqueous solution containing 10% by weight acrylamide and 0.005% by weight of Compound 35 is irradiated with a 500 watt tungsten filament projector lamp placed 10 inches from the sample for 2 minutes. The solution turns into a viscous mass containing polyacrylamide.

EXAMPLE 3

A solution containing 20% by weight of vinylcarbazole in dichloromethane and 0.1% of Compound 12 are coated on a glass plate and irradiated through a photographic negative with visible light for 15 minutes. The plate is then washed with a solvent to remove the unirradiated and unpolymerized portions. The remaining relief is then inked and applied to paper. A high quality reproduction is produced.

EXAMPLE 4

A coating is made according to Example 3, but in addition, two more initiators are added, namely, Compound 10 and Compound 19. The element is exposed in an imagewise manner to visible light for 20 minutes. The unexposed areas of the plate are washed off with a solvent. The remaining areas are inked with black ink forming a good reproduction of the original subject.

EXAMPLE 5

A methanol solution containing 20% methyl methacrylate and 0.1% of Compound 12 is irradiated at a distance of 5 centimeters with a 100 watt tungsten lamp for 35 minutes. The precipitate formed is found to be polymethyl methacrylate.

EXAMPLE 6

An ethanol solution containing 20% styrene and 0.1% of Compound 13 is irradiated in the manner set forth in Example 5. The temperature is maintained between −15° C. and −20° C. The solid polymer formed is analyzed and found to be polystyrene.

The invention has been described in detail with particular reference to preferred embodiments thereof, but it will be understood that variations and modifications can be effected within the spirit and scope of the invention as described hereinabove and as defined in the appended claims.

We claim:

1. A photopolymerizable composition comprising a vinyl monomer and a photochemical initiator having a formula selected from the group consisting of:

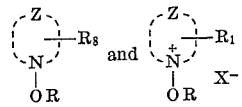

wherein:
(A) $R_1$ is selected from the group consisting of
  (a) a methine linkage terminated by a heterocyclic nucleus of the type contained in cyanine dyes,
  (b) an alkyl radical,
  (c) an anilinovinyl radical,
  (d) a hydrogen atom,
  (e) an aryl radical,
  (f) an aldehyde group and
  (g) a styryl radical;
(B) $R_8$ is selected from the group consisting of
  (a) a methine linkage terminated by a heterocyclic nucleus of the type contained in merocyanine dyes, and
  (b) an allylidene radical;
(C) R is selected from the group consisting of
  (a) an alkyl radical and
  (b) an acyl radical;
(D) X is an acid anion, and
(E) Z represents the atoms necessary to complete a 5 to 6 membered heterocyclic nucleus.

2. The photopolymerizable composition of claim 1 wherein Z represents the atoms necessary to complete a member selected from the group consisting of a pyridine nucleus, a quinoline nucleus and an indole nucleus.

3. The photopolymerizable composition of claim 1 wherein $R_1$ is a methine linkage terminated by a 5 to 6 membered heterocyclic nucleus having at least one hetero nitrogen atom.

4. A photopolymerizable composition comprising a vinyl monomer and a photochemical initiator having the formula:

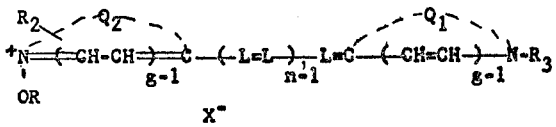

wherein:
(A) $Q_1$ and $Q_2$ each represent the non-metallic atoms necessary to complete a 5 to 6 membered heterocyclic nucleus;
(B) R is selected from the group consisting of
  (a) an alkyl radical and
  (b) an acyl radical;
(C) $R_2$ is selected from the group consisting of
  (a) an aryl radical
  (b) a hydrogen atom, and
  (c) an alkyl radical;
(D) L is a methine linkage;
(E) X is an acid anion;
(F) g is a positive interger from 1 to 2;

(G) $n$ is a positive integer from 1 to 4; and
(H) $R_3$ is selected from the group consisting of an alkyl radical, an alkenyl radical, an aryl radical and an alkoxy radical.

5. The photopolymerizable composition of claim 4 wherein $Q_2$ represents the atoms necessary to complete a member selected from the group consisting of a pyridine nucleus, a quinoline nucleus and an indole nucleus.

6. A photopolymerizable composition comprising a vinyl monomer and a photochemical initiator having the formula:

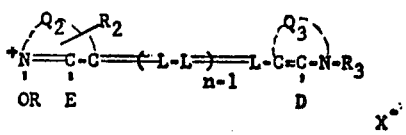

wherein:
(A) $Q_2$ and $Q_3$ each represent the non-metallic atoms necessary to complete a 5 to 6 membered heterocyclic nucleus;
(B) R is selected from the group consisting of:
  (a) an alkyl radical and
  (b) an acyl radical;
(C) $R_2$ is selected from the group consisting of:
  (a) an aryl radical,
  (b) a hydrogen atom, and
  (c) an alkyl radical;
(D) L is a methine linkage;
(E) X is an acid anion;
(F) $n$ is a positive integer from 1 to 4;
(G) $R_3$ is selected from the group consisting of an alkyl radical, an alkenyl radical, an aryl radical, and an alkoxy radical; and
(H) D and E are each selected from the group consisting of a hydrogen atom, an alkyl radical and an aryl radical.

7. The photopolymerizable composition of claim 6 wherein $Q_2$ represents the atoms necessary to complete a member selected from the group consisting of a pyridine nucleus, a quinoline nucleus and an indole nucleus.

8. A photopolymerizable composition comprising a vinyl monomer and a photochemical initiator having the formula:

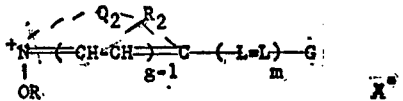

wherein:
(A) $Q_2$ represents the atoms necessary to complete a 5 to 6 membered heterocyclic nucleus;
(B) R is selected from the group consisting of:
  (a) an alkyl radical and
  (b) an acyl radical;
(C) $R_2$ is selected from the group consiting of:
  (a) an aryl radical,
  (b) a hydrogen atom, and
  (c) an alkyl radical;
(D) L is a methine linkage;
(E) X is an acid anion;
(F) G is selected from the group consisting of an anilino-vinyl radical and an aryl radical;
(G) $m$ is a positive integer from 1–3; and
(H) $g$ is a positive integer from 1–2.

9. The photopolymerizable composition of claim 8 wherein $Q_2$ represents the atoms necessary to complete a member selected from the group consisting of a pyridine nucleus, a quinoline nucleus and an indole nucleus.

10. A photopolymerizable composition comprising a vinyl monomer and a photochemical initiator having the formula:

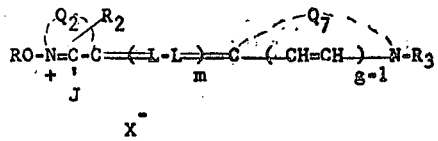

wherein:
(A) $Q_2$ and $Q_7$ each represent the non-metallic atoms necessary to complete a 5 to 6 membered heterocyclic nucleus;
(B) R is selected from the group consisting of:
  (a) an alkyl radical and
  (b) an acyl radical;
(C) $R_2$ and J are each selected from the group consisting of:
  (a) an aryl radical,
  (b) a hydrogen atom, and
  (c) an alkyl radical;
(D) $R_3$ is selected from the group consisting of an alkyl radical, an alkenyl radical, and aryl radical and an alkoxy radical;
(E) L is a methine linkage;
(F) X is an acid anion;
(G) $m$ is a positive integer from 1 to 3; and
(H) $g$ is a positive integer from 1 to 2.

11. The photopolymerizable composition of claim 10 wherein $Q_2$ represents the atoms necessary to complete a member selected from the group consisting of a pyridine nucleus, a quinoline nucleus and an indole nucleus.

12. A photopolymerizable composition comprising a vinyl monomer and a photochemical initiator having the formula:

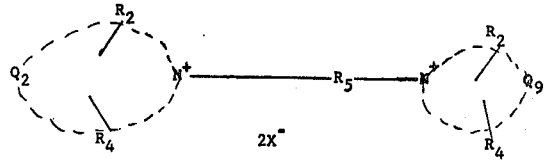

wherein:
(A) $Q_2$ and $Q_9$ each represent the non-metallic atoms necessary to complete a 5 to 6 membered heterocyclic nucleus;
(B) $R_2$ and $R_4$ are each selected from the group consisting of:
  (a) an alkyl radical,
  (b) an aryl radical and
  (c) a hydrogen atoms;
(C) X is an acid anion; and
(D) $R_5$ is an alkyleneoxy radical having 1–8 carbon atoms in the alkylene chain.

13. The photopolymerizable composition of claim 12 wherein $Q_2$ and $Q_9$ each represent the atoms necessary to complete a member selected from the group consisting of a pyridine nucleus, a quinoline nucleus and an indole nucleus.

14. A photopolymerizable composition comprising a vinyl monomer and a photochemical initiator having the formula:

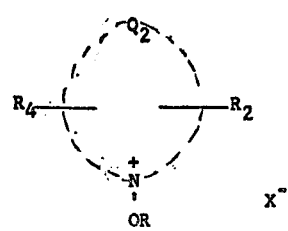

wherein:
(A) $Q_2$ represents the non-metallic atoms necessary to complete a 5 to 6 membered heterocylic nucleus;
(B) R is selected from the group consisting of an alkyl radical, and an acyl radical;
(C) $R_2$ and $R_4$ are each selected from the group consisting of an aryl radical, a hydrogen atom and an alkyl radical; and
(D) X is an acid anion.

15. The photopolymerizable composition of claim 14 wherein $Q_2$ and $Q_9$ each represent the atoms necessary to complete a member selected from the group consisting of a pyridine nucleus, a quinoline nucleus and an indole nucleus.

16. An image-forming element comprising a support and at least one layer of a photopolymerizable composition comprising a vinyl monomer and a photochemical initiator having a formula selected from the group consisting of:

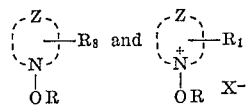

wherein:
(A) $R_1$ is selected from the group consisting of:
  (a) a methine linkage terminated by a heterocyclic nucleus of the type contained in cyanine dyes,
  (b) an alkyl radical,
  (c) an anilinovinyl radical,
  (d) a hydrogen atom,
  (e) an aryl radical,
  (f) an aldehyde group, and
  (g) a styryl radical;
(B) $R_8$ is selected from the group consisting of
  (a) a methine linkage terminated by a heterocyclic nucleus of the type contained in merocyanine dyes, and
  (b) an allylidene radical;
(C) R is selected from the group consisting of:
  (a) an alkyl radical and
  (b) an acyl radical;
(D) X is an acid anion; and
(E) Z represents the atoms necessary to complete a 5 to 6 membered heterocyclic nucleus.

17. The image-forming element as defined in claim 16 wherein Z represents the atoms necessary to complete a member selected from the group consisting of a pyridine nucleus, a quinoline nucleus and an indole nucleus.

18. The image-forming element as defined in claim 16 wherein $R_1$ is a methine linkage terminated by a 5 to 6 membered heterocyclic nucleus having at least one hetero nitrogen atom.

19. An image-forming element comprising a support and at least one layer of a photopolymerizable composition comprising a vinyl monomer and a photochemical initiator having a formula selected from the group consisting of:

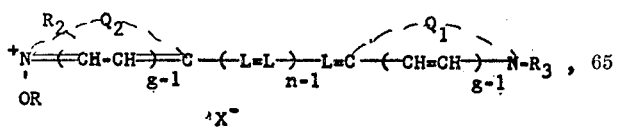

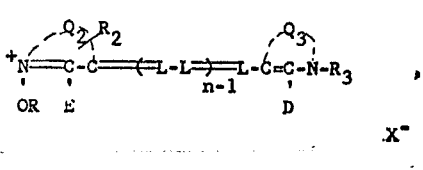

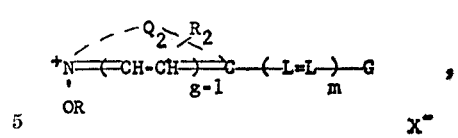

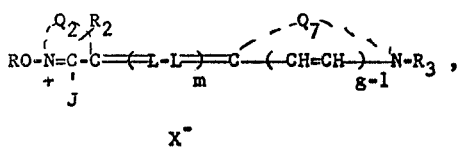

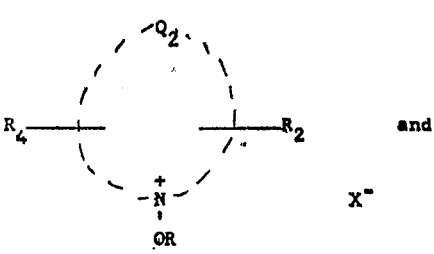

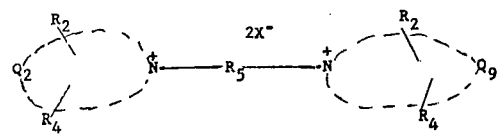

wherein:
(A) $Q_1$, $Q_2$, $Q_3$, $Q_7$ and $Q_9$ each represent the non-metallic atoms necessary to complete a 5 to 6 membered heterocyclic nucleus;
(B) $n$ is a positive integer from 1 to 4;
(C) $m$ is a positive integer from 1 to 3;
(D) $R_5$ is an alkyleneoxy radical having 1 to 8 carbon atoms in the alkylene chain;
(E) $g$ is a positive integer from 1 to 2;
(F) X is an acid anion;
(G) L is a methine linkage;
(H) R is selected from the group consisting of an alkyl radical and an acyl radical;
(I) D, E, J, $R_2$ and $R_4$ are each selected from the group consisting of an aryl radical, a hydrogen atom and an alkyl radical;
(J) $R_3$ is selected from the group consisting of an alkyl radical, an alkenyl radical, an aryl radical and an alkoxy radical; and
(K) G is selected from the group consisting of an anilinovinyl radical and an aryl radical.

20. The image-forming element as defined in claim 19 wherein said composition comprises a vinyl monomer and a photochemical initiator having the formula:

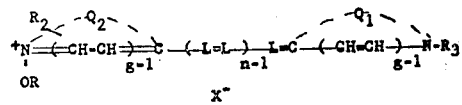

wherein R, $R_2$, $R_3$, $Q_1$, $Q_2$, L, X, $g$ and $n$ are as defined previously.

21. The image-forming element as defined in claim 19 wherein said composition comprises a vinyl monomer and a photochemical initiator having the formula:

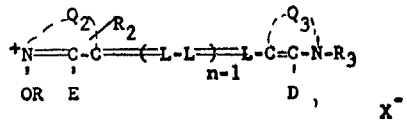

wherein R, $R_2$, $R_3$, $Q_2$, $Q_3$, L, D, E, X and $n$ are as defined previously.

22. The image-forming element as defined in claim 19 wherein said composition comprises a vinyl monomer and a photochemical initiator having the formula

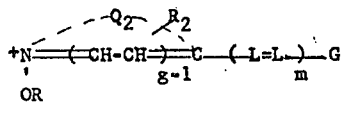

wherein R, $R_2$, $Q_2$, L, G, X, $m$ and $g$ are as defined previously.

23. The image-forming element as defined in claim 19 wherein said composition comprises a vinyl monomer and a photochemical initiator having the formula:

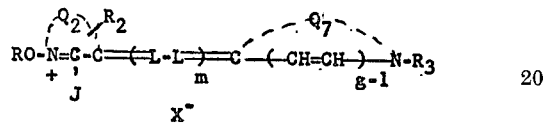

wherein R, $R_2$, $R_3$, J, $Q_2$, $Q_7$, L, X, $m$ and $g$ are as defined previously.

24. The image-forming element as defined in claim 19 wherein said composition comprises a vinyl monomer and a photochemical initiator having the formula:

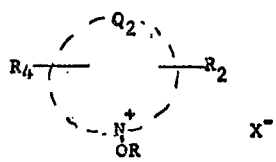

wherein R, $R_2$, $R_4$, $Q_2$, and X are as defined previously.

25. The image-forming element as defined in claim 19 wherein said composition comprises a vinyl monomer and a photochemical initiator having the formula:

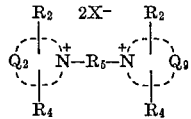

wherein $R_2$, $R_4$, $Q_2$, $Q_9$, X and $R_5$ are as defined previously.

26. A process for forming an image which comprises exposing a photographic element in an imagewise manner to a pattern of actinic radiation, said element comprising a support having coated thereon a layer of a polymerizable composition comprising a vinyl monomer and a photochemical initiator having a formula selected from the group consisting of:

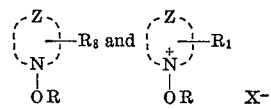

wherein:
(A) $R_1$ is selected from the group consisting of a methine linkage terminated by a heterocyclic nucleus of the type contained in cyanine dyes, an alkyl radical, an anilino vinyl radical, a hydrogen atom, an aryl radical, an aldehyde group and a styryl radical;
(B) $R_8$ is selected from the group consisting of
(a) a methine linkage terminated by a heterocyclic nucleus of the type contained in merocyanine dyes, and
(b) an allylidene radical;
(C) R is selected from the group consisting of an alkyl radical and an acyl radical;
(D) X is an acid anion, and
(E) Z represents the atoms necessary to complete a 5 to 6 membered heterocyclic nucleus.

27. The process of claim 26 wherein Z represents the atoms necessary to complete a member selected from the group consisting of a pyridine nucleus, a quinoline nucleus and an indole nucleus.

28. The process of claim 26 wherein $R_1$ is a methine linkage terminated by a 5 to 6 membered heterocyclic nucleus having at least one hereto nitrogen atom.

29. A process for forming an image which comprises exposing a photographic element in an imagewise manner to a pattern of actinic radiation, said element comprising a support having coated thereon a layer of a polymerizable composition comprising a vinyl monomer and a photochemical initiator having a formula selected from the group consisting of:

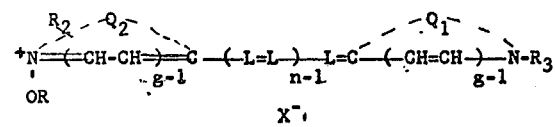

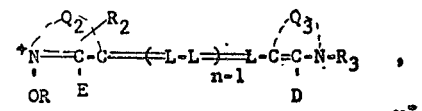

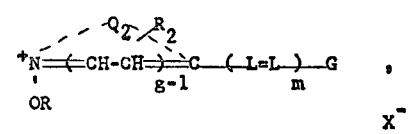

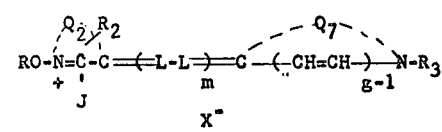

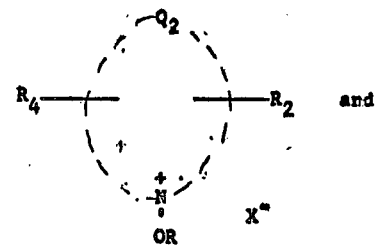
and

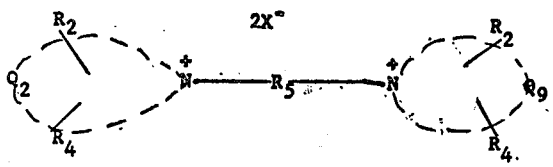

wherein:
(A) $Q_1$, $Q_2$, $Q_3$, $Q_7$ and $Q_9$ each represent the nonmetallic atoms necessary to complete a 5 to 6 membered heretocyclic nucleus;
(B) $n$ is a positive integer from 1 to 4;
(C) $m$ is a positive integer from 1 to 3;
(D) $g$ is a positive integer from 1 to 2;
(E) X is an acid anion;
(F) L is a methine linkage;
(G) $R_5$ is an alkyleneoxy radical having 1 to 8 carbon atoms in the alkylene chain;
(H) R is selected from the group consisting of an alkyl radical and an acyl radical;
(I) D, E, J, $R_2$ and $R_4$ are each selected from the group consisting of an aryl radical, a hydrogen atom and an alkyl radical;

(J) $R_3$ is selected from the group consisting of an alkyl radical, an alkenyl radical, an aryl radical and an alkoxy radical; and (K) G is selected from the group consisting of an anilinovinyl radical and an aryl radical.

30. The process of claim 29 wherein said photochemical initiator has the formula:

$$\overset{+}{N}\!\!\underset{\underset{OR}{|}}{=}\!\!(CH\text{-}CH\!=\!)_{g\text{-}1}\!C\text{-}(\text{-}L\!=\!L\text{-})_{n\text{-}1}\!\!-\!L\!=\!C\text{-}(\text{-}CH\!=\!CH\text{-})_{g\text{-}1}\!\!\!-\!N\text{-}R_3 \quad X^-$$

wherein R, $R_2$, $R_3$, $Q_1$, $Q_2$, L, X, g and n are as defined previously.

31. The process of claim 29 wherein said photochemical initiator has the formula:

$$\overset{+}{N}\!=\!C\text{-}C\underset{\underset{OR\ E}{|\ \ \ |}}{=\!\!=}(\text{-}L\text{-}L\text{-})_{n\text{-}1}\!L\text{-}\overset{}{C}\!=\!C\text{-}N\text{-}R_3$$

wherein R, $R_2$, $R_3$, $Q_2$, $Q_3$, L, D, E, X and n are as defined previously.

32. The process of claim 29 wherein said photochemical initiator has the formula:

$$\overset{+}{N}\!\!\underset{\underset{OR}{|}}{=}\!\!(CH\text{-}CH\!=\!)_{g\text{-}1}\!C\text{-}(\text{-}L\!=\!L\text{-})_m\!\!-\!G \quad X^-$$

wherein R, $R_2$, $Q_2$, L, G, X, m and g are as defined previously.

33. The process of claim 29 wherein said photochemical initiator has the formula:

$$RO\text{-}\overset{+}{N}\!=\!C\text{-}\overset{}{C}\underset{\underset{J}{|}}{=\!\!=}(\text{-}L\text{-})_m\!C\text{-}(\text{-}CH\!=\!CH\text{-})_{g\text{-}1}\!N\text{-}R_3 \quad X^-$$

wherein R, $R_2$, $R_3$, J, $Q_2$, $Q_7$, L, X, m and g are as defined previously.

34. The process of claim 29 wherein said photochemical initiator has the formula:

$$R_4\text{—}\!\!\overset{Q_2}{\underset{\underset{\underset{OR}{|}}{\overset{+}{N}}}{\diamond}}\!\!\text{—}R_2 \quad X^-$$

wherein R, $R_2$, $R_4$, $Q_3$, and X are as defined previously.

35. The process of claim 29 wherein said photochemical initiator has the formula:

$$\underset{R_4}{\overset{R_2}{\diamond}}\!\!\overset{Q_2}{\underset{}{}}\!\!\overset{+}{N}\!\!-\!\!R_5\!\!-\!\!\overset{+}{N}\!\!\underset{R_4}{\overset{R_2}{\diamond}}\!\!Q_9$$

wherein $R_2$, $R_4$, $Q_2$, $Q_9$, X and $R_5$ are as defined previously.

36. A photographic element comprising a support having coated thereon a layer of a polymerizable composition comprising a vinyl monomer, 3-ethyl-1-methoxy-2-pyridothiacarbocyanine perchlorate as a polymerization initiator and a solvent for said monomer and initiator.

37. A photographic element comprising a support having coated thereon a layer of a polymerizable composition comprising a vinyl monomer, 1'-ethoxy-3-ethyloxa-2'-pyridocarbocyanine tetrafluoroborate as a polymerization initiator and a solvent for said monomer and initiator.

38. A photographic element comprising a support having coated thereon a layer of a polymerizable composition comprising a vinyl monomer, 1'-ethoxy-3'-ethyl-2-pyridothiacarbocyanine tetrafluoroborate as a polymerization initiator and a solvent for said monomer and initiator.

39. A photographic element comprising a support having coated thereon a layer of a polymerizable composition comprising a vinyl monomer, 3-ethyl-1'-methoxy-4,5 - benzo - 2'-pyridothiacarbocyanine perchlorate as a polymerization initiator and a solvent for said monomer and initiator.

40. A photographic element comprising a support having coated thereon a layer of a polymerizable composition comprising a vinyl monomer, 1'-ethoxy-3-ethyl-4,5-benzo - 2'-pyridothiacarbocyanine tetrafluoroborate as a polymerization initiator and a solvent for said monomer and initiator.

41. A photographic element comprising a support having coated thereon a layer of a polymerizable composition comprising a vinyl monomer, 1-ethoxy-2-methylpyridinium tetrafluoroborate as a polymerization initiator and a solvent for said moonmer and initiator.

42. A photographic element as described in claim 16 wherein the vinyl monomer is selected from the group consisting of a vinylcarbazole, acrylamide, methyl methacrylate and styrene.

References Cited

UNITED STATES PATENTS 2,991,285  7/1961  Feely _____ 260—287

WILLIAM D. MARTIN, Primary Examiner

D. COHEN, Assistant Examiner

U.S. Cl. X.R.

96—115, 88, 89; 260—240.4, 240.6

PO-1050
(5/69)

UNITED STATES PATENT OFFICE
CERTIFICATE OF CORRECTION

Patent No. 3,574,622  Dated April 13, 1971

Inventor(s) Philip W. Jenkins, Donald W. Heseltine and John D

It is certified that error appears in the above-identified patent and that said Letters Patent are hereby corrected as shown below:

Column 19, line 20, that portion of the formula reading

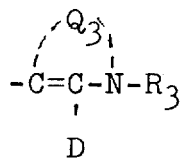   should read   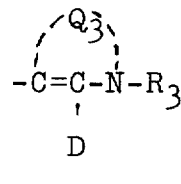

Column 20, line 46 reading

"a solvent for said moonmer and initiator."

should read

--a solvent for said monomer and initiator.--

Signed and sealed this 19th day of October 1971.

(SEAL)
Attest:

EDWARD M. FLETCHER, JR.  ROBERT GOTTSCHALK
Attesting Officer  Acting Commissioner of Patents